US009527468B2

(12) United States Patent
Vasseur et al.

(10) Patent No.: US 9,527,468 B2
(45) Date of Patent: Dec. 27, 2016

(54) AIRBAG DOOR ASSEMBLY

(71) Applicant: Zodiac Seats France, Issoudun (FR)

(72) Inventors: Alexandre Vasseur, Issoudun (FR); Jean-Marc Obadia, Issoudun (FR)

(73) Assignee: Zodiac Seats France, Issoudun (FR)

( * ) Notice: Subject to any disclaimer, the term of this patent is extended or adjusted under 35 U.S.C. 154(b) by 0 days.

(21) Appl. No.: 14/542,887

(22) Filed: Nov. 17, 2014

(65) Prior Publication Data
US 2015/0217713 A1   Aug. 6, 2015

Related U.S. Application Data

(60) Provisional application No. 61/935,439, filed on Feb. 4, 2014.

(51) Int. Cl.
*B60R 21/2155* (2011.01)
*B60R 21/237* (2006.01)
*B60R 21/231* (2011.01)
*B60R 21/216* (2011.01)

(52) U.S. Cl.
CPC ......... *B60R 21/2155* (2013.01); *B60R 21/216* (2013.01); *B60R 21/231* (2013.01); *B60R 21/237* (2013.01); *B64D 2201/00* (2013.01)

(58) Field of Classification Search
CPC ................ B60R 21/215; B60R 21/216; B60R 2021/2161
See application file for complete search history.

(56) References Cited

U.S. PATENT DOCUMENTS

| 5,224,732 | A | * | 7/1993 | Warner | B60R 21/0136 |
| | | | | | 280/730.2 |
| 5,385,366 | A | * | 1/1995 | Frank | B60R 21/16 |
| | | | | | 280/728.3 |
| 5,398,959 | A | * | 3/1995 | Avila | B60R 21/215 |
| | | | | | 280/728.3 |
| 5,435,594 | A | * | 7/1995 | Gille | B60R 21/20 |
| | | | | | 280/728.2 |
| 5,460,401 | A | * | 10/1995 | Gans | B60R 21/216 |
| | | | | | 280/728.3 |
| 5,738,368 | A | | 4/1998 | Hammond et al. | |
| 6,464,255 | B1 | * | 10/2002 | Preisler | B60R 21/206 |
| | | | | | 280/732 |
| 6,955,376 | B1 | * | 10/2005 | Labrie | B29C 45/14 |
| | | | | | 280/728.3 |

(Continued)

FOREIGN PATENT DOCUMENTS

DE    4008243 A1    9/1991

OTHER PUBLICATIONS

International Patent Application No. PCT/IB2014/066122, Search Report and Written Opinion dated Mar. 17, 2015.

(Continued)

*Primary Examiner* — Darlene P Condra
(74) *Attorney, Agent, or Firm* — Kilpatrick Townsend & Stockton LLP; Dean W. Russell; Kristin M. Crall

(57) ABSTRACT

Embodiments of the present invention provide an airbag door assembly for use in a vehicle. The door assembly includes a moving door panel that deforms under pressure of an airbag as it deploys. The airbag system employing this airbag door assembly may be installed in a cavity in a structure on-board the vehicle, or it may be independently mounted to a vehicle structure.

16 Claims, 5 Drawing Sheets

(56) References Cited

U.S. PATENT DOCUMENTS

| | | | |
|---|---|---|---|
| 8,894,095 B1 | 11/2014 | Meister et al. | |
| 2003/0184058 A1* | 10/2003 | Gray | B60R 21/216 |
| | | | 280/728.3 |
| 2004/0262892 A1* | 12/2004 | Soejima | B29C 59/007 |
| | | | 280/728.3 |
| 2005/0127642 A1* | 6/2005 | Weissert | B60R 21/216 |
| | | | 280/728.3 |
| 2005/0140121 A1* | 6/2005 | Hayashi | B60R 21/205 |
| | | | 280/728.3 |
| 2006/0186646 A1* | 8/2006 | Bauer | B60R 21/2155 |
| | | | 280/728.3 |
| 2014/0027574 A1 | 1/2014 | Obadia et al. | |

OTHER PUBLICATIONS

International Patent Application No. PCT/IB2014/066122, International Preliminary Report on Patentability dated Aug. 18, 2016.

* cited by examiner

AIRBAG DOOR ASSEMBLY

CROSS REFERENCE TO RELATED APPLICATIONS

This application claims the benefit of U.S. Provisional Application Ser. No. 61/935,439, filed Feb. 4, 2014, titled "Airbag Door Assembly," the entire contents of which are hereby incorporated by reference.

FIELD OF THE DISCLOSURE

Embodiments of the present disclosure relate generally to an airbag door assembly for use in a vehicle. The door assembly includes a moving door panel that deforms under pressure of an airbag as it deploys.

BACKGROUND

Airbags are occupant restraining devices, which typically include a flexible envelope or "bag" that is designed to inflate rapidly during a collision in order to prevent the vehicle's occupants from striking interior objects located in front of (or, in some cases, on the side of, or forward and on the side of) the occupant. In automobiles, airbags are designed to prevent occupants from striking the steering wheel, the vehicle door, a window, or any other interior objects. In aircraft, airbags are designed to prevent passengers from striking the seat in front each passenger, the tray tables, a window, a privacy screen, a monument, or any other interior objects. Airbags on passenger rail cars (such as trains, monorails, trolleys), road vehicles (RVs, motorcycles, automobiles, and so forth), water vessels, space vessels, and any other passenger transport vehicles can work similarly.

Most modern vehicles contain multiple airbags. For example, most automobiles provide an airbag in front of each occupant seating position (at least in the front seat), to protect the head and torso. They may also contain knee airbags, which protect the occupant's knees and legs. Most aircraft provide airbags either positioned in the back of each seat (so as to deploy for the passenger sitting behind that seat or other structure from which the airbag deploys) or in the seat belts. (For example, passengers sitting in the front seat or bulkhead in the aircraft do not have a seat in front of them, so in this instance, the airbag may be positioned in the passenger seat belt.) Passenger vehicles may also contain airbags in side locations, which can inflate between an occupant and the vehicle door or the vehicle window or wall.

Typically, sensors deploy one or more airbags in an impact zone at variable rates based on the type and severity of impact. Most airbags are designed to only inflate in moderate to severe frontal crashes. Airbags are normally designed with the intention of supplementing the protection of an occupant who is correctly restrained with a seatbelt. Since their invention and introduction, airbags have continually been improved upon.

In aircraft, airbag opening and deployment may be managed by a tearing line in a material or by the use of fuse fixation clips. For these systems, there should be the correct adjustment of tearing strength of the material or fuse element, which requires testing processes. However, further airbag improvements are desirable, including airbags that have varying designs for deployment systems for various types of seating arrangements in passenger vehicles.

BRIEF SUMMARY

Embodiments described herein thus provide an airbag system door panel for an airbag system that is manufactured from a flexible and deformable material that can cause the door panel to deform outwardly and disengage from one or more flange-like door securing features upon application of pressure to the door panel, but wherein the material has sufficient structural rigidity to prevent passenger tampering.

Embodiments also provide an airbag system that has a back plate frame comprising an outer perimeter with one or more flange portions; a folded airbag positioned against the back plate frame; a door panel secured with respect to the back plate frame via the one or more flange portions and capable of flexible deformation upon deployment of the airbag; and a fixation system for preventing the door panel from become a projectile upon deployment of the airbag.

DETAILED DESCRIPTION

Embodiments of the present disclosure provide an airbag door assembly that allows the door to open in order to release the airbag upon deployment. The door panel is maintained in contact with respect to a back frame and an airbag is positioned therebetween. This contact may either be a direct contact or an indirect contact (via other components that help form the back frame.) When the airbag is inflated, the door extends away from the frame to allow deployment of the airbag. The door panel is of a material that has sufficient flexibility that allows is to go through at least a slight deformation upon pressure from the airbag, such that the door panel releases from the back frame. Using the flexibility of the door panel and its deformation under the pressure of the airbag cushion can be advantageous over previous airbag deployment systems.

Figure 1:
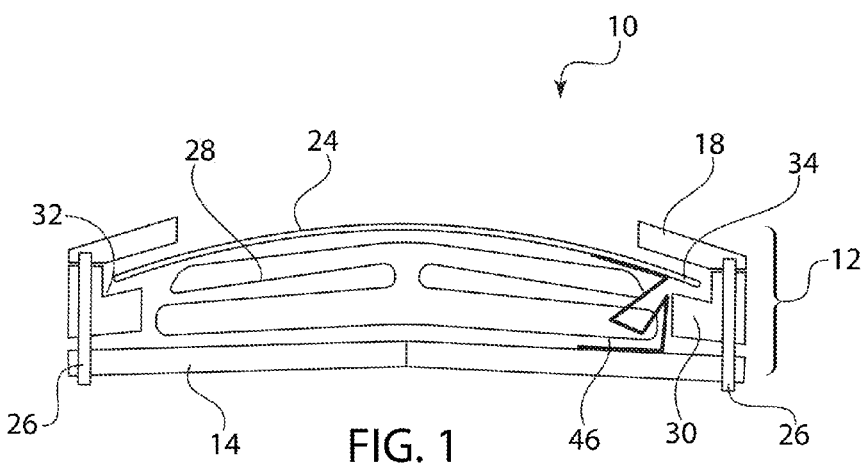
FIG. 1 shows a top cross-sectional view of one embodiment of an airbag system with door panel that releases from back frame.
Figure 2:
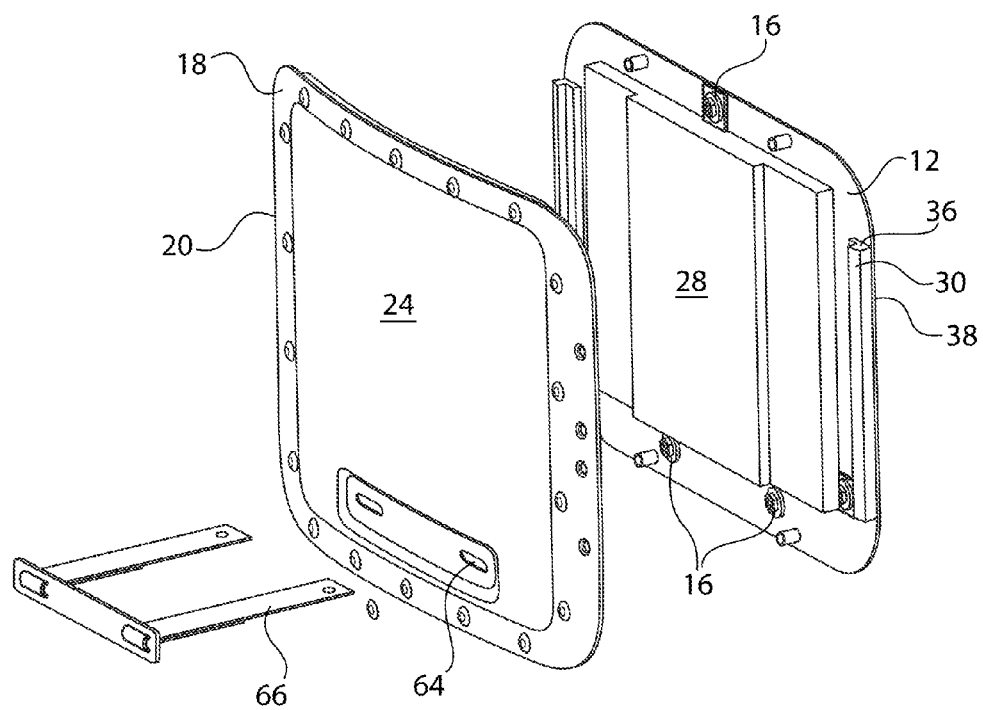
FIG. 2 shows a perspective exploded view of an airbag system.
Figure 3:
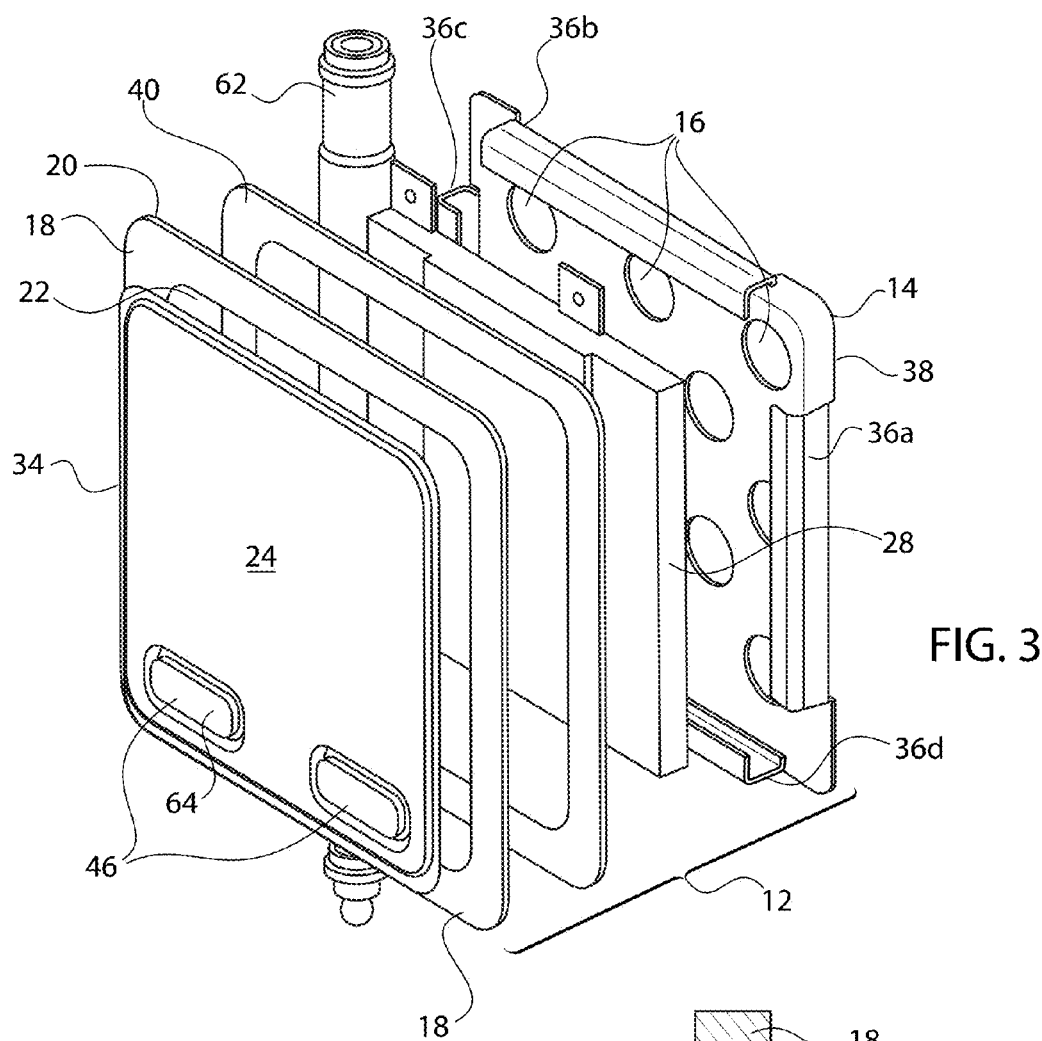
FIG. 3 shows a perspective exploded view of an airbag system.

FIG. 1 illustrates a top cross-sectional view of one embodiment of an airbag system 10. This system 10 includes a back plate frame 12. The back plate frame 12 can have a rear panel 14 that is designed for securement to any surface. In one example, the rear panel 14 may have one or more fixation openings 16 for effecting attachment of the rear panel 14 (and thus the back plate frame 12) to a vehicle structure. FIGS. 2 and 3 show examples of various sizes and positions for the fixation openings 16 on the rear panel 14, but it should be understood that any appropriate options may be used. The general goal is to secure the rear panel 14 to the structure from which the airbag should deploy. Although the figures show a square-shaped back plate frame 12 and rear panel 14, it should be understood that any shape or configuration may be used. For example, they may be circular, oval, oblong, triangular, or any other shape. The door panel will generally be a similar shape as the shape of the back frame.

Referring now to FIGS. 1 and 2, an outer frame 18 may be provided. The outer frame 18 may be a perimeter 20 that is similarly shaped to correspond to the rear panel 14, but with an open interior 22. (The open interior 22 is where the door panel 24 will be positioned in use and can be seen in FIG. 3.) The outer frame 18 may be secured to the rear panel 14 via one or more fixation elements 26. The outer frame 18 and rear panel 14 house a folded airbag 28 in use.

Optional inner frame elements 30 may be provided at the edges of the rear panel 14 in order to help create a space between the rear panel 14 and the outer frame 18. In one example, the optional inner frame elements 30 may comprise one or more flange portions 32 that can secure the door panel 24 between the flange portion 32 and the outer frame 18. For example, as shown in FIG. 1, the door panel 24 has edges 34 that can be pinched between a flange segment 32 of the inner frame element 30 and the outer frame 18.

Alternatively, the rear panel 14 itself may have one or more flange segments 36 positioned thereon. In this embodiment, the rear panel 14 may have an outer perimeter 38 that may be defined by one or more flanges 36, as shown in FIGS. 2 and 3. In one example, a flange 36 may extend around the entire perimeter 38 of the rear panel 14. In another example, there may be one or more flange sections 36a, b, c, d positioned about the perimeter 38. If rear panel 14 is square-shaped as shown, one option is to provide a flange section 36 (a-d) on each edge of the panel 14. This embodiment may also be provided with a tightening plate 40. Tightening plate 40 may be used to provide the proper height and/or thickness equivalent relative to the thickness of the door 24. This is an optional feature. It is also possible for a similar plate or additional thickness to be machines onto the outer frame 18.

Figure 4:
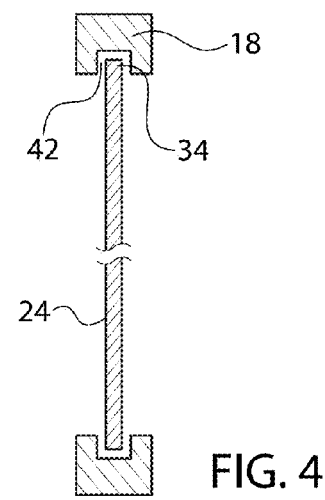
FIG. 4 shows a cross sectional view of an alternate securing embodiment for a door panel.

It should also be understood that other securement methods may be used. For example, as shown in FIG. 4, the outer frame 18 itself may be formed with one or more inner grooves 42, into which edges 34 of the door panel 24 may fit. The general concept is that the door panel 24 is secured in such a way that it can deploy as described herein.

Referring back to the cross-sectional view of FIG. 1, the edges 34 of the door panel are generally maintained behind the outer frame 18 (or within the outer frame 18, as shown in FIG. 4). As described, the edges 34 may be secured within one or more flange portions of the rear panel 14, within the flange segments 32 of an inner frame 30, or within one or more grooves 42 of the outer panel 18. In any event, the door panel 24 is securely maintained in place with respect to the back plate frame 12 (and consequently, with respect to the structure on the vehicle), such that tampering with or pressure on the door panel 24 by a passenger or other person should generally not dislodge the door panel 24 from its secured position. For example, it is generally desirable that a passenger not be able to remove the door panel 24 from the frame due to tampering. The door panel 24 is generally sized so that it is larger than the surface from which it expands, and can only dislodge or release from the smaller frame 12 due to flexibility of the door panel 24.

The door panel 24 is generally formed of a material that has flexibility and can deform under pressure. When the airbag 28 deploys due to receiving inflation air from an inflator 62, the door panel 24 may have sufficient flexibility such that it slides out from the frame that secures it in place. The material, however, should have sufficient integrity to protect the airbag behind the door panel when the airbag is not in use. The pressure from the folded airbag 28 against the door panel 24 does not cause movement or deformation of the door panel 24. Pressure from inflation/deployment of the airbag 28 is what causes movement or deformation of the door panel 24.

In a specific embodiment, the door panel 24 may be formed of a thermoplastic material, such as polycarbonate. In another embodiment, the door panel 24 may be formed as a composite material. In one example, the door panel may be manufactured from a phenolic resin. In another example, the door panel may be manufactured from Kevlar fibers or material. Any combinations may also be used. The door panel may be rigid to the touch, but flexible upon sufficient pressure.

The securement of the door panel 24 is the way described means that door panel 24 need not have a tear seam. There need not be any breakable part on the system 10 for deployment. The door panel 24 dislodges from its secured position with respect to the back frame 12 due to flexible characteristics of the door panel 24. Prior to its deployment, the door panel 24 may lie close to flush with the outer frame 18, as shown in FIG. 2. The pressure required for deformation of the door panel may be varied, depending upon the vehicle, the distance of the passenger from the fixed structure in the vehicle, the seat sizes (which may influence the size of the bag), and any other factors. However, in one specific embodiment, the pressure required for deformation and release of the door panel may be between about 0.5 to about 2 bars of pressure or about 28-30 pounds per square inch.

Figure 5:
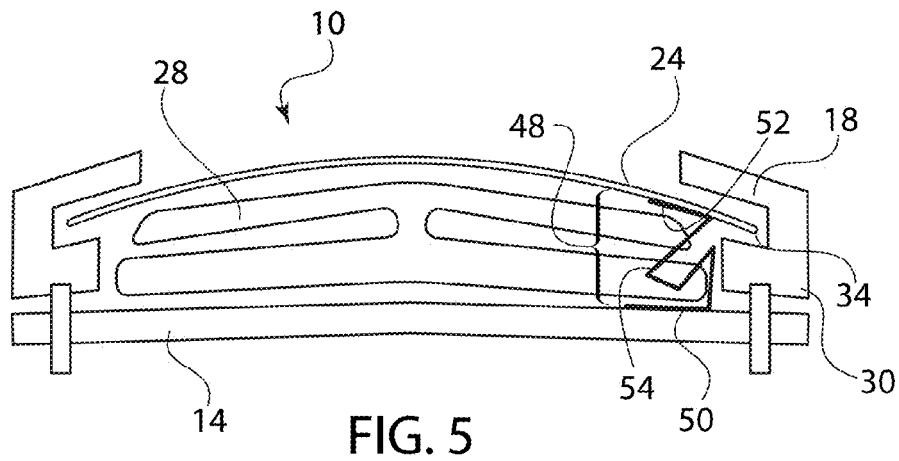
FIGS. 5-9 shows a series of images illustrating deployment of an airbag and opening of the door panel.
Figure 6:
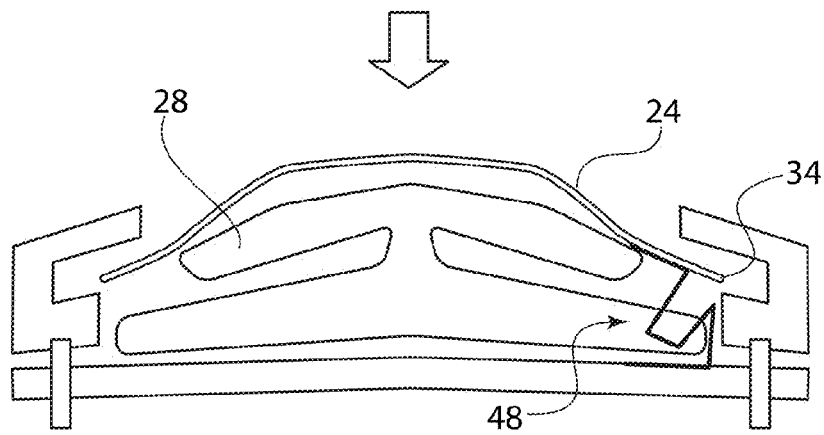

A fixation system 46 may also be provided. The fixation system 46 is for preventing the door panel 24 from become a projectile upon deployment of the airbag. In one example, the fixation system 46 may be a tether or strap that secures the door panel 24 to the back plate frame 12. The door panel 24 may have one or more openings 64 that receive a tether or strap 66. In another example, the fixation system 46 may be a hinge that secures the door panel 24 to the back plate frame 12. In another example, the fixation system 46 may be a bracket or buckle that secures the door panel 24 to the back plate frame 12. In another example, the fixation system 46 may be a spring configuration that secures the door panel 24 to the back plate frame 12. The spring may maintain pressure against the door panel and help its swift movement away from the passenger to be protected upon airbag deployment. In another example, the fixation system 46 may be an elastomeric joint that secures the door panel 24 to the back plate frame 12. The location of this fixation may be along or at any side of the door 24. It may be at the right side, left side, the top, the bottom, or any combination thereof In one example, the deployment shown by FIGS. 5-9 illustrates a type of hinge 48 that is secured to the rear panel 14 and to the door panel 24. The hinge 48 may have a first arm 50 secured to the rear panel 14 or other fixed structure on the vehicle, a second arm 52 secured to the door panel 24, and a middle collapsible/expandable section 54. The securement of the hinge 48 to the rear panel 14 and door panel 24 is shown as being at one edge of the system 10. When a crash condition or other deployment trigger occurs, pressure from deployment of the folded airbag 28 causes pressure against the door panel 24. Because the door panel 24 is made of a flexible material, the door panel 24 can deform so that edges 34 of the door panel are pushed out from the outer frame 18 or other flange system that is securing the door panel in place. FIG. 5 shows the edges 34 secured in place. The airbag system 10 components remain fixed together. The door panel 24 is inserted between the outer frame 18 and the inner frame 30. FIG. 6 shows an early deployment stage, in which the door panel edges 34 are dislodging from the outer frame 18. Deployment pressure on the airbag 28 pushes on the door panel 24 and causes it to deform, bend, or otherwise curve outwardly in a way that causes the edges 34 to disengage from their secured position. The edges 34 start to slide out from securement. FIGS. 5 and 6 show the hinge 48 being in a compressed position. This compression may be provided a spring feature, a foldable material, a plastic strip, a metal strip, or any other configuration that can retain the door panel 24 as desired.

Figure 7:
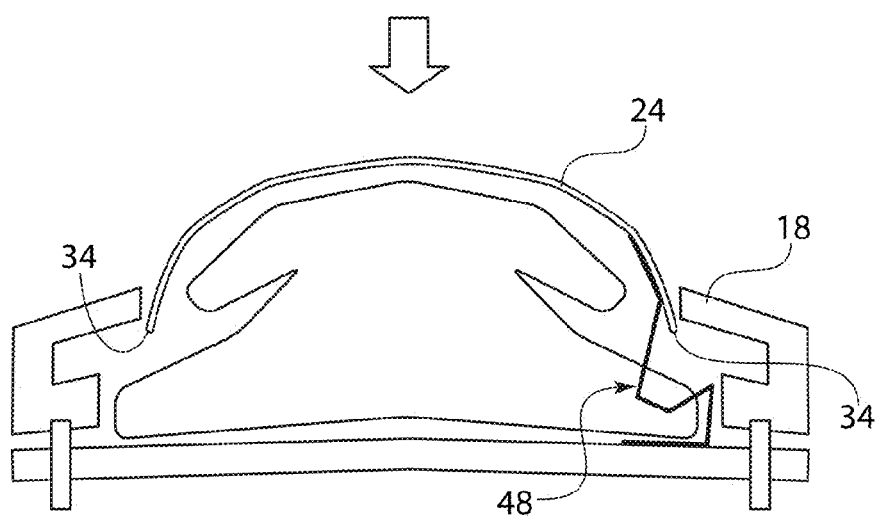
Figure 8:
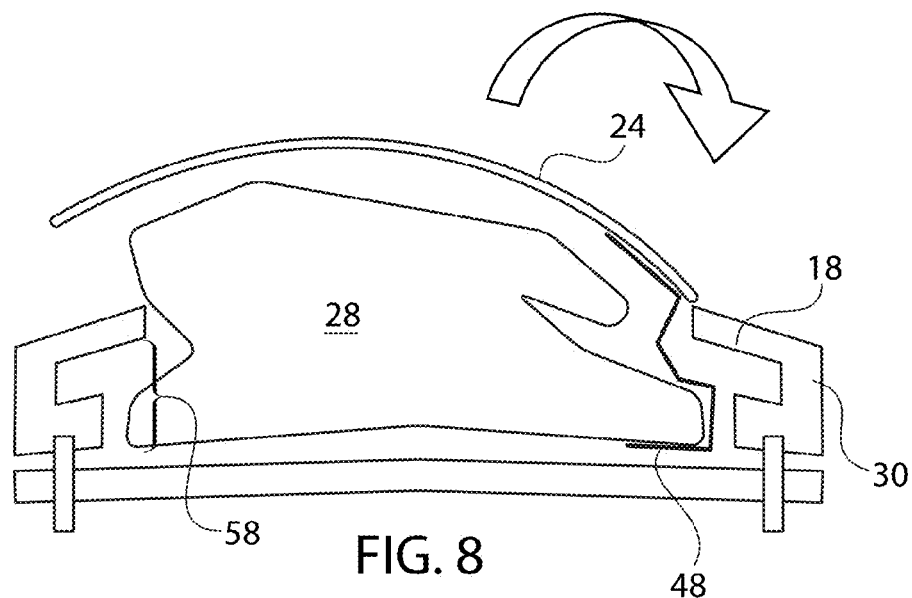
Figure 9:
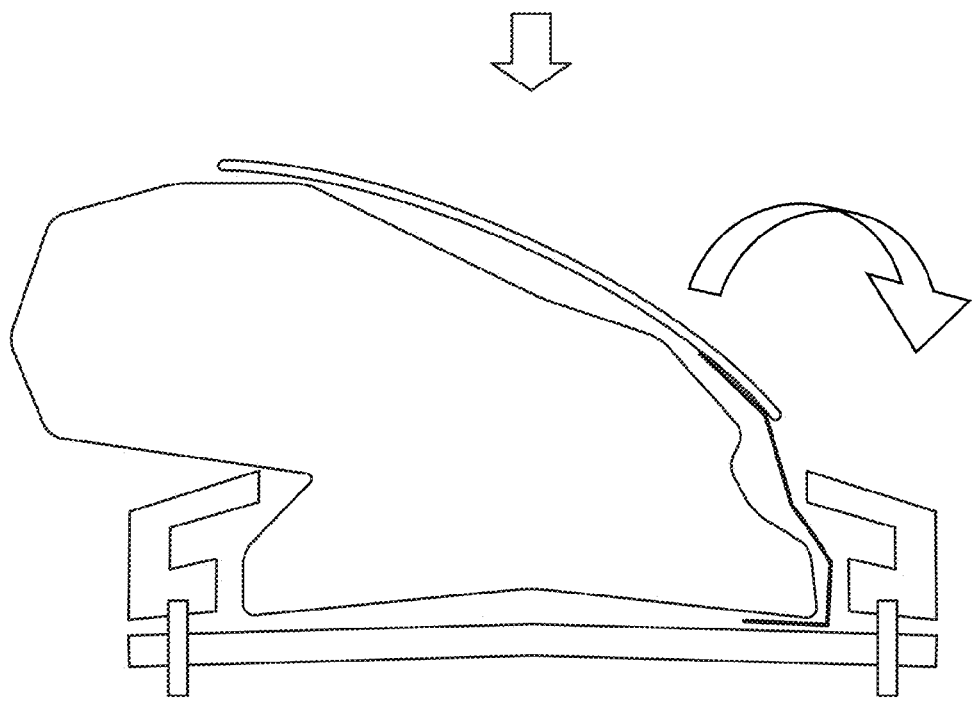

FIG. 7 shows the edges 34 as they are completely dislodged or otherwise freed from the outer frame 18. This Figure shows the hinge 48 expanding from a compressed position to a more expanded position. This may be referred to as deployment of the fixation system 46 (and in this particular embodiment, the hinge 48). Due to securement of the door panel 24 via the hinge 48, continued pressure from the airbag 28 causes the door panel 24 to open further, as shown in FIGS. 8 and 9. In FIG. 8, the airbag 28 continues to inflate and begins to extend outside the airbag cavity 58 created by the system 10. The door panel 24 is not in contact with the outer frame 18 or the inner frame 30, and the hinge 48 starts to rotate the door panel 24. In one example, the hinge 48 may be under tension, which helps rotation of the door panel 24. The door panel 24 rotates against the hinge 48 so that the door panel 24 moves away and allows a full deployment of the airbag for protection of the passenger.

This entire sequence happens very quickly. In some embodiments, the door panel 24 moves and allows deployment of the airbag in about 2-4 milliseconds.

Although a single door panel 24 has been shown and described, it should be understood that more than one door may form a door panel system. For example, two doors may be provided that are secured at a middle portion, such that they open like French doors upon application of pressure. More doors may also be provided, so as to provide a multi-flap configuration. The door panel(s) may also be secured at the upper portion or at a lower portion, so that they open up or down (rather than to the side, as shown). It is also possible for the door to be provided in several parts with overlapping portions.

Figure 11:
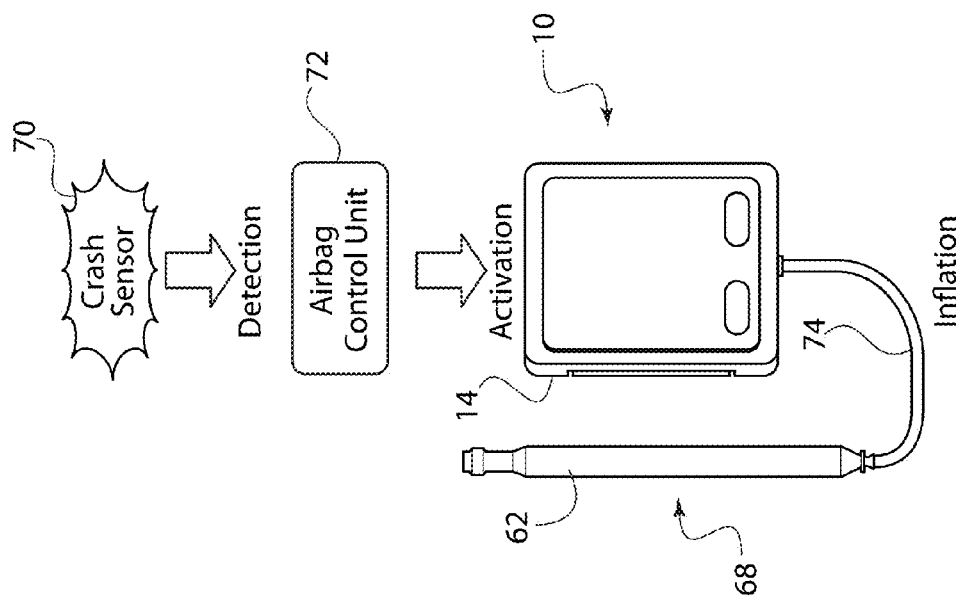
FIG. 11 shows an airbag system with a crash sensor, airbag control unit, and inflator.
Figure 10:
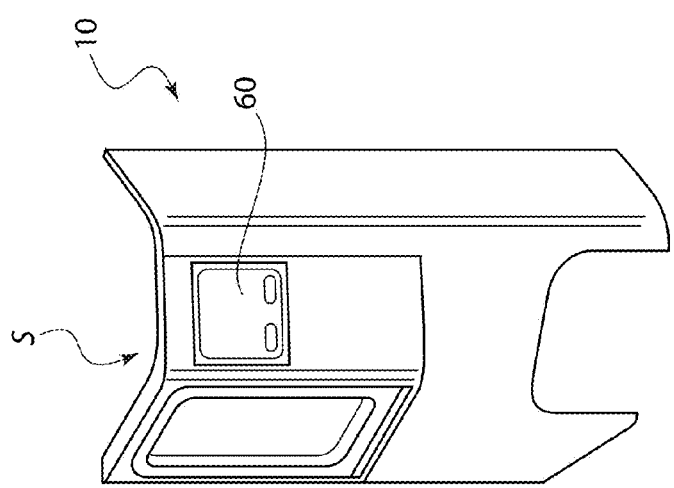
FIG. 10 shows an embodiment of a monument structure having a cavity for receiving an airbag system.

The airbag system 10 described may be secured to an aircraft monument, privacy shell, seat back, wall, or any other structure (generally referred to as structure "S" in FIG. 10) that may be positioned in front of a passenger or in front of a seating area. The structure S may be formed with an opening or cavity 60 that can receive the system 10, such that the system 10 may be installed in the monument or privacy shell or seat back or other structure during manufacture or may be installed in the structure at a later point. It is also possible to provide the airbag system 10 as a stand-alone unit 68 as shown in FIG. 11, such that it can be installed directly to a structure surface. For example, the airbag system 10 may be secured to an aircraft wall or any other location where there may be a risk of passenger injury during a crash or other collision event. The rear panel 14 may be secured directly to the structure. In this embodiment, the airbag system 10 will not be recessed or flush with the structure surface S, but it can provide a mobile unit that can be installed anywhere needed on-board.

Although the examples have been described with respect to an aircraft, it should also be understood that the airbag system 10 described may be used on-board any other type of passenger transport vehicle, such as vehicles designed for railway travel, water travel, space travel, road travel, or any other vehicles.

FIG. 11 provides an overview of additional features that may be included in the airbag system 10. For example, the crash may be detected by a crash sensor 70. The crash sensor communicates with an airbag control unit 72 in order to trigger airbag inflation. The airbag control unit 72 can send a signal to the gas inflator 62 to deliver inflation gas through the hose 74 to the airbag 28 contained within the airbag system 10.

Changes and modifications, additions and deletions may be made to the structures and methods recited above and shown in the drawings without departing from the scope or spirit of the invention and the following claims.

What is claimed is:

1. An airbag system, comprising:
   a back plate frame comprising an outer perimeter with one or more flange portions;
   a folded airbag positioned against the back plate frame;
   a door panel secured with respect to the back plate frame via the one or more flange portions,
   wherein edges of the door panel are secured behind the flange portions, wherein the door panel is capable of flexible deformation upon deployment of the airbag such that the edges of the door panel become dislodged from the one or more flange portions; and
   a fixation system for preventing the door panel from become a projectile upon deployment of the airbag.

2. The airbag system of claim 1, wherein the fixation system comprises at least one fixation member that cooperates with the back plate frame and the door panel and that maintains the door panel in relation to the back plate frame upon airbag deployment.

3. The airbag system of claim 2, wherein the fixation member comprises a strap, tether, buckle, hinge, spring, elastomeric joint, or any combination thereof.

4. The airbag system of claim 1, wherein the back plate frame comprises an airbag supporting space.

5. The airbag system of claim 1, wherein the airbag system is configured to be installed into a cavity in an aircraft monument or an aircraft privacy screen.

6. The airbag system of claim 1, wherein the airbag system is an independent system that is configured to be directly installed on an aircraft surface.

7. The airbag system of claim 1, wherein the back plate frame comprises one or more fixation openings for effecting attachment of the back plate frame to a vehicle structure.

8. The airbag system of claim 1, further comprising:
   a crash sensor, an airbag control unit, and an inflator,
   wherein the crash sensor detects a crash condition and relays information to the airbag control unit, which causes the inflator to begin deployment of the airbag.

9. The airbag system of claim 1, further comprising a tightening plate.

10. The airbag system of claim 1, wherein the door panel comprises one or more openings for receiving a fixation member of the fixation system.

11. The airbag system of claim 1, wherein the edges of the door panel are pinched between the one or more flange portions and the outer frame.

12. An airbag system, comprising:
   a back plate frame comprising an outer perimeter with one or more flange portions;
   a folded airbag positioned against the back plate frame;
   a door panel secured with respect to the back plate frame via the one or more flange portions and capable of flexible deformation upon deployment of the airbag; and
   a fixation system for preventing the door panel from become a projectile upon deployment of the airbag, wherein the back plate frame comprises an outer perimeter with one or more flange portions further comprises a rear panel and an outer frame, wherein the rear panel and the outer frame create a containing area for the folded airbag.

13. The airbag system of claim 12, wherein the one or more flange portions are positioned on the rear panel and wherein edges of the door panel are pinched between the one or more flange portions and the outer frame.

14. The airbag system of claim 12, wherein the one or more flange portions are positioned on the back plate frame and wherein edges of the door panel are positioned behind the one or more flange portions, and wherein the outer frame and door panel are secured to the rear panel.

15. An airbag system door panel, comprising
a door panel manufactured from a flexible and deformable material adapted to cause the door panel to deform outwardly and disengage from one or more flange-like door securing features upon application of pressure to the door panel, but wherein the material has sufficient structural rigidity to prevent passenger tampering,
the airbag system door panel in use with an airbag system, the airbag system comprising a rear panel and an outer frame, wherein the rear panel comprises one or more flange portions and wherein the door panel is secured between the one or more flange portions and the outer frame.

16. The airbag door panel of claim 15, wherein the door panel is secured to a frame via a fixation system for preventing the door panel from being a projectile upon airbag deployment.

* * * * *